(12) United States Patent
Marold et al.

(10) Patent No.: US 6,676,192 B2
(45) Date of Patent: Jan. 13, 2004

(54) MOTOR VEHICLE HAVING A ROOF WITH SLIDING CONVERTIBLE TOP

(75) Inventors: Adolf Marold, Ehningen (DE); Ulrich Moll, Aidlingen (DE); Siegfried Zipperle, Aidlingen (DE)

(73) Assignee: DaimlerChrysler AG, Stuttgart (DE)

( * ) Notice: Subject to any disclaimer, the term of this patent is extended or adjusted under 35 U.S.C. 154(b) by 43 days.

(21) Appl. No.: 10/207,515

(22) Filed: Jul. 29, 2002

(65) Prior Publication Data

US 2003/0038502 A1 Feb. 27, 2003

(30) Foreign Application Priority Data

Aug. 4, 2001 (DE) .......................... 101 38 370

(51) Int. Cl.⁷ .................................. B60J 7/00
(52) U.S. Cl. ........................ 296/107.19; 296/107.01; 296/219; 296/216.04
(58) Field of Search .................. 296/107.19, 107.01, 296/219, 220.01, 107.2, 216.04; 287/56

(56) References Cited

U.S. PATENT DOCUMENTS

| | | | |
|---|---|---|---|
| 2,694,598 A | * | 11/1954 | Ulrich |
| 2,861,836 A | * | 11/1958 | Goeggel |
| 4,893,868 A | * | 1/1990 | Miller et al. |
| 5,052,747 A | * | 10/1991 | Kubota et al. |
| 5,054,847 A | * | 10/1991 | Asoh et al. |
| 5,421,635 A | * | 6/1995 | Reinsch et al. |
| 5,944,378 A | * | 8/1999 | Mather et al. |
| 6,412,860 B1 | * | 7/2002 | Reinsch |
| 6,530,621 B1 | * | 3/2003 | Williams et al. |

FOREIGN PATENT DOCUMENTS

| | | |
|---|---|---|
| DE | 195 03 786 | 8/1996 |
| DE | 196 34 507 | 1/1998 |
| DE | 199 27 234 | 7/2000 |
| EP | 0 347 859 | 12/1989 |

* cited by examiner

*Primary Examiner*—D. Glenn Dayoan
*Assistant Examiner*—Scott Carpenter
(74) *Attorney, Agent, or Firm*—Kenyon & Kenyon (57) ABSTRACT

A motor vehicle having a front roof region which has a roof opening which may be closed by a sliding convertible top, having a rear roof region which includes roof columns connected to one another via a body crossmember, and having sliding guidance of the sliding convertible top along lateral guides of the front and rear roof regions, the sliding convertible top being guided roughly horizontally rearwardly in the front roof region and so as to be lowered downwardly into a stowage position in the rear roof region by the guides. The guides in the rear roof region are arranged on a side of the roof columns which faces the interior space of the motor vehicle, the sliding convertible top being guided in front of the body crossmember of the rear roof region between the roof columns.

10 Claims, 7 Drawing Sheets

FIG. 7

MOTOR VEHICLE HAVING A ROOF WITH SLIDING CONVERTIBLE TOP

CROSS-REFERENCE TO RELATED APPLICATIONS

The present application claims foreign priority to Application No. 101 38 370.3, filed in the Federal Republic of Germany on Aug. 4, 2001, which is expressly incorporated herein in its entirety by reference thereto.

FIELD OF THE INVENTION

The present invention relates to a motor vehicle.

BACKGROUND INFORMATION

A motor vehicle as described in European Published Patent Application No. 0 347 859 includes a front sectional roof which adjoins a windscreen frame and has a roof opening which can be closed by a sliding convertible top. Furthermore, a rear sectional roof is provided which includes roof columns connected to one another via a crossmember. The sliding convertible top is guided roughly horizontally rearwardly in a sliding manner along lateral guides of the front sectional roof and along lateral guides of the rear sectional roof so as to be lowered downwardly into a stowage position.

In the region of the rear sectional roof, the outer contour and the aerodynamic properties of the roof are disadvantageously affected by the sliding convertible top being guided on the outside and stowed in a lower open position.

SUMMARY

It is an object of the present invention to provide a motor vehicle with a sliding convertible top which permits a freer configuration of the outer contour of the roof and the roof of which has improved aerodynamic properties.

The above and other beneficial objects of the present invention are achieved by providing a motor vehicle as described herein.

Since, according to the present invention, the guides in the rear roof region are arranged on that side of the roof columns which faces the interior space of the motor vehicle, freer configuration of the outer contour of the rear roof region is possible. Additionally, the roof of the motor vehicle according to the invention has improved aerodynamic properties due to the guidance of the sliding convertible top in the interior space of the motor vehicle.

The sliding convertible top may be lowered into a convertible-top stowage space which is arranged close to the interior space below an aperture of a rear wall.

In an example embodiment of the present invention, the sliding convertible top includes a center convertible-top section, which may be pushed together, between a rigid front convertible-top section and a rigid rear convertible-top section. During the opening of the roof, the center convertible-top section is shortened, essentially only after the rear convertible-top section has reached a stowage position in a convertible-top stowage space. The center convertible-top section is not folded until in the convertible-top stowage space, so that the opening in the convertible-top stowage space may be selected to be significantly smaller than in conventional sliding convertible tops of this type.

DETAILED DESCRIPTION

Figure 1:
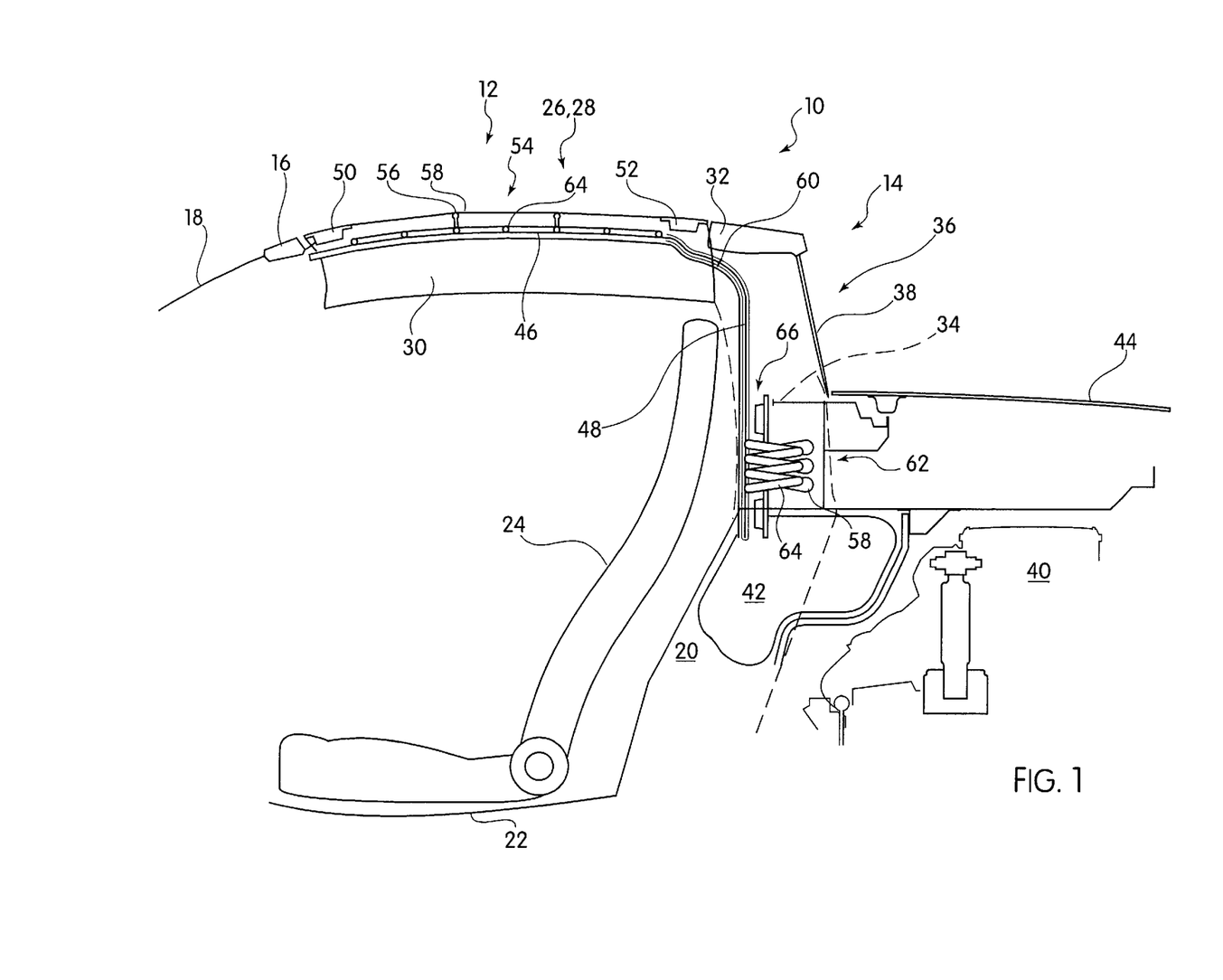
FIG. 1 is a schematic sectional view along the center longitudinal axis of the motor vehicle according to the present invention, which has a sliding convertible top which is movable in lateral guides of a front and a rear roof region.

FIG. 1, in a schematically indicated sectional view along a center longitudinal axis, illustrates a two-seater roadster motor vehicle with notchback, the motor vehicle including a roof 10 having a front and a rear roof region 12, 14. In the passenger compartment, a windscreen 18 carried by a windscreen frame 16 is illustrated in front of the front roof region 12. Additionally, in the passenger compartment, a B-column section 20 defining the lateral door opening and a sill section 22 are schematically indicated. A vehicle seat 24 is illustrated inside the passenger compartment.

Figure 2:
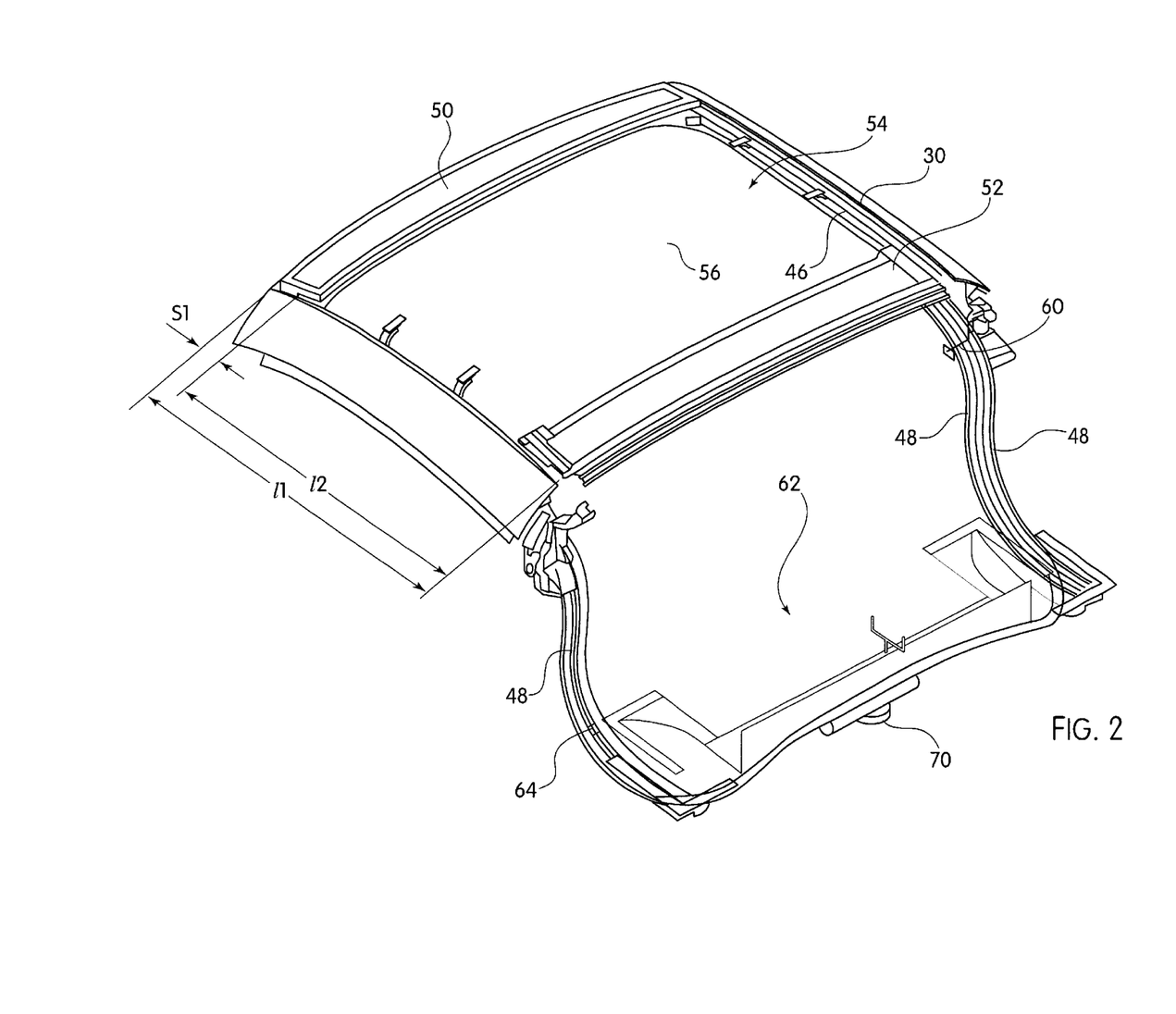
FIG. 2 is a schematic perspective view of the closed sliding convertible top according to a second example embodiment.
Figure 3:
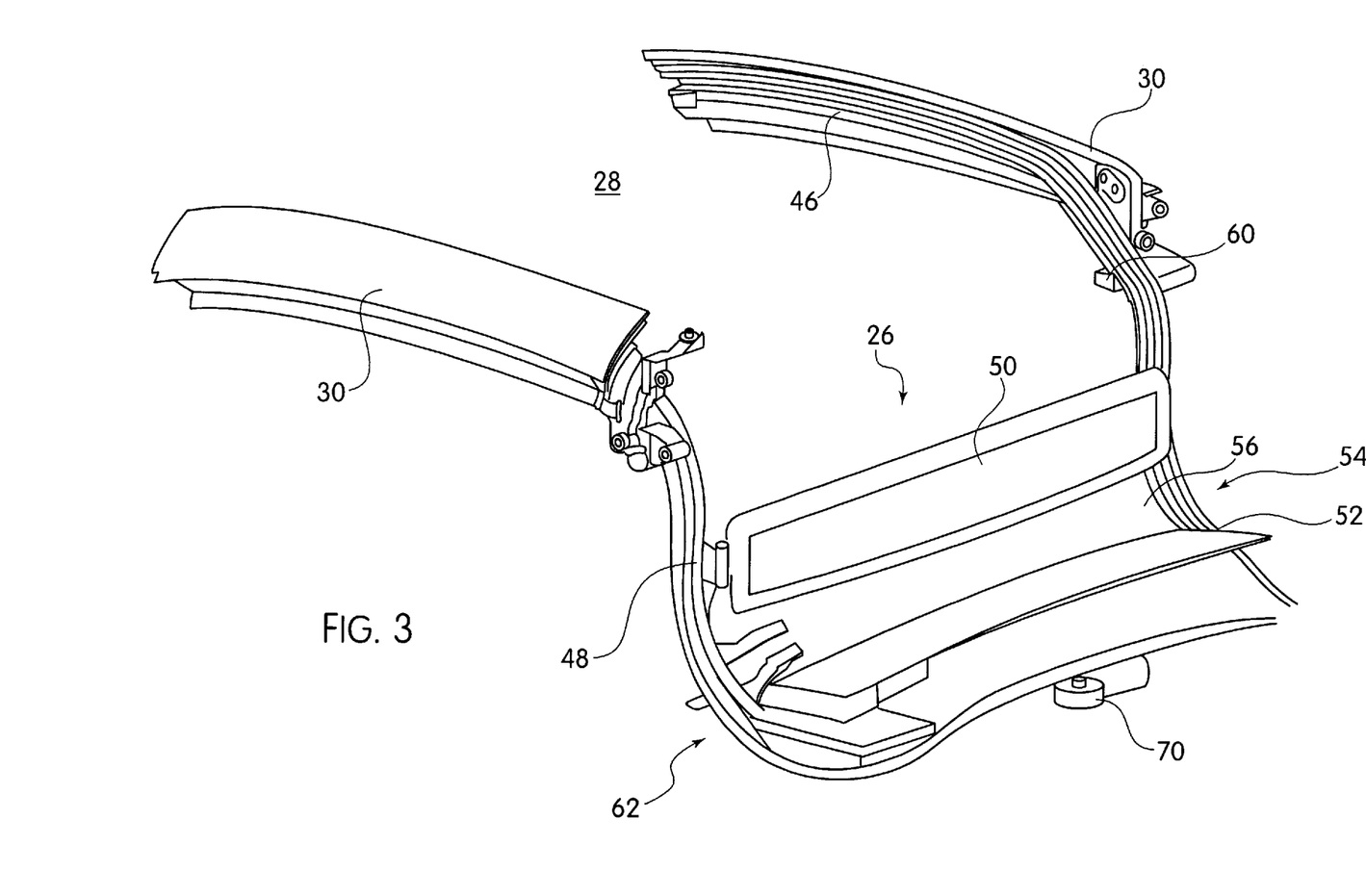
FIG. 3 is a schematic perspective view of the open sliding convertible top illustrated in FIG. 2.

The front roof region 12 has a roof opening 28 which may be closed by a sliding convertible top 26 and which is laterally defined by two removable roof spars 30, which extend between the windscreen frame 16 and the rear roof region 14 and are illustrated in particular in FIGS. 2 and 3. The sliding convertible top 26 is illustrated in the closed and stowed position in FIG. 1, in the closed position in FIG. 2 and in the open position in FIG. 3. As will be explained in more detail further below, the two roof spars 30 may be removed from the roof 10 when the sliding convertible top 26 or roof opening 28 is completely open.

The rear roof region 14 includes roof columns 34 connected to one another via a body crossmember 32, and which are indicated by broken lines in FIG. 1 and form an extension of the B-column sections 20. The body crossmember 32 and the roof columns 34 form, as a unit, a rollover bar adapted on the outside to the outer contour of the motor vehicle. The rear roof region 14 includes a rear wall 36 with an aperture 38 which is closed by a rear window which may be moved in the vertical direction for opening and closing the aperture 38. In the tail of the motor vehicle, a drive unit 40, a fuel tank 42 and a boot lid 44 on the top side of a boot space are illustrated in FIG. 1.

As illustrated in FIGS. 1 to 3 the sliding convertible top 26 for opening and closing the roof opening 28 may be moved with sliding guidance along lateral guides 46, 48 of the front and the rear roof region 12, 14. The lateral guides 46 in the front roof region 12 are integrated in the lateral roof spars 30. The lateral guides 48 of the rear roof region 14 are arranged on the inside of the roof columns 34. In rear roof region 14, the roof columns 34 and the body crossmember 32 are not illustrated in FIGS. 2 and 3, however the roof spars 30, laterally defining the roof opening 28, of the front roof region 12 are illustrated. The sliding roof 26, indicated in the closed position in FIG. 2 and in the open position in FIG. 3, essentially includes a rigid front and a rigid rear convertible-top section 50, 52 which form the front end and, respectively, the rear end of the sliding convertible top 26. The front and rear convertible-top sections 50, 52 are connected to one another via a center convertible-top section 54 which may be pushed together and is described in more detail further below. In the center convertible-top section 54, only two drag bows 56 distributed over its length are illustrated in FIGS. 2 and 3, these drag bows 56 being guided in a sliding manner along the guides 46, 48 by a suitable arrangement. A folding cover 58, illustrated in FIG. 1 is made, for example, of a convertible-top material, and extends between the front and rear convertible-top sections 50, 52. The folding cover 58 is also fastened to the top side of the drag bows 56. The top sides of the sections 50, 52 and 54 may lie in a common roof plane which is adapted in height to the roof spars 30. Here, the guides 46 in the front roof region 12 and the guides 48 in the rear roof region 14 are configured as rails which are roughly U-shaped in cross-section and point with their open side in the direction of the vehicle center. As illustrated in FIG. 1, the guides 46 in the front roof region 12 extend roughly horizontally rearwardly, and the guides 48 in the rear roof region 14 extend roughly vertically downwardly into a stowage position of the sliding convertible top 26. In this case, the guides 46, 48 are fastened via receptacles to the roof spars 30 or on a side of the roof columns 34 which faces the interior space of the motor vehicle. In the transition region between the front and rear roof regions 12, 14, the rails 46 and 48 laterally assigned to one another in each case merge into one another at a separating point 60. The separating point 60 of the respective rails serves to enable the roof spars 30 to be removed from the roof after the sliding convertible top 26 or the roof opening 28 has been completely opened. Furthermore, the rails 46, 48 have a roughly S-shaped curvature in the transition region between the front and rear roof regions 12, 14 and a further curvature in the corner region between the front, horizontal profile and the rear, vertical profile. As a result, the sliding convertible top 26 is guided downwardly in front of the body crossmember 32 of the rear roof region 14 between the roof columns 34 into the stowage position.

In the region of the lower end of the guides 48 in the rear roof region 14, the sliding convertible top 26 may be lowered into a convertible-top stowage space which is arranged under the aperture 38 of the rear wall 36 of the rear roof region 14. In this case, the guides 48 in the rear roof region 14—as illustrated in FIG. 1—may end in a roughly vertically extending manner or—as illustrated in FIGS. 2 and 3—may have a further curvature, so that the ends of the guides 48 end roughly horizontally. Accordingly, the rigid convertible-top sections 50, 52 in the exemplary embodiment illustrated in FIG. 1, in their stowage position, extend roughly vertically with their outside. In the stowage position illustrated in FIG. 3, the rear rigid convertible-top section 52 extends roughly horizontally with its outside, and the front rigid convertible-top section 50 extends roughly vertically with its outside.

During the opening of the sliding convertible top 26, in an initial opening phase, after the unlocking, the front convertible-top section 50, with slight shortening of the center convertible-top section 54 of, for example, 10 to 30 mm (s1 (FIG. 2)), is moved toward the rear convertible-top section 52, which remains in a fixed position, so that the folding cover 58, which is tightened at first, is relieved for opening the roof, but essentially remains smooth and flat. After this shortening of the distance L1 between the front and rear convertible-top sections 50, 52 or of the length of the center convertible-top section 54 to the distance L2, the front and rear convertible-top sections 50, 52 are moved equally, with a distance L2 being maintained, in a direction of the stowage position illustrated in FIGS. 1 and 3. The folding cover 58 remains virtually in an originally smooth, flat state during the entire opening movement of the sliding convertible top 26. The relief of the folding cover 58 by the length s1 which is effected at the start of the opening movement, serves to ensure that the sliding convertible top 26 or its folding cover 58, when being transferred into the stowage position, in particular when passing through the corner region between the front and rear guides 46, 48, is not tightened excessively and may thus be brought easily into the stowage position. Within the course of the opening movement, the rear convertible-top section 52 passes through the corner region between the front and rear roof regions 12, 14 until the rear convertible-top section 52 reaches a lower stowage position—either vertically according to FIG. 1 or horizontally according to FIG. 3. Once the rear convertible-top section 52 has reached a stowage position in the convertible-top stowage space 62, during further opening of the sliding convertible top 26 and the associated displacement of the front convertible-top section 52 rearwardly or downwardly, the shortening of the center convertible-top section 54 starts by the folding cover 58 being pushed together. In this exemplary embodiment illustrated in FIG. 1, a control arrangement 64 with scissor kinematics are provided on the underside of the folding cover 58, the scissor kinematics capable of being pushed together and folding the folding cover 58 only after the rear convertible-top section 52 has reached a stowage position in the convertible-top stowage space 62. In the process, the folding cover 58 is folded starting from the rear convertible-top section 52, wherein the part of the folding cover 58 which is close to the front convertible-top section 50 remains largely smooth and flat until the part of the folding cover 58, depending on the extent to which the center convertible-top section 54 has been pushed together, is also folded. In this case, the folding operation is effected solely inside the convertible-top stowage space 62, so that the opening 66, illustrated in FIG. 1, in the convertible-top stowage space 62 merely has to correspond approximately to the cross-section of the convertible top in the unfolded, smooth state. Because the sliding convertible top is moved with its entire length 12 into the convertible-top stowage space 62 and is only folded there, the opening 66 may be selected to be significantly smaller than in the conventional sliding convertible tops 26 of this type. The sliding convertible top 26 may also be retained in any intermediate position between the closed position and the stowage position, so that the roof opening 28 is, for example, only partly open.

Figure 4:
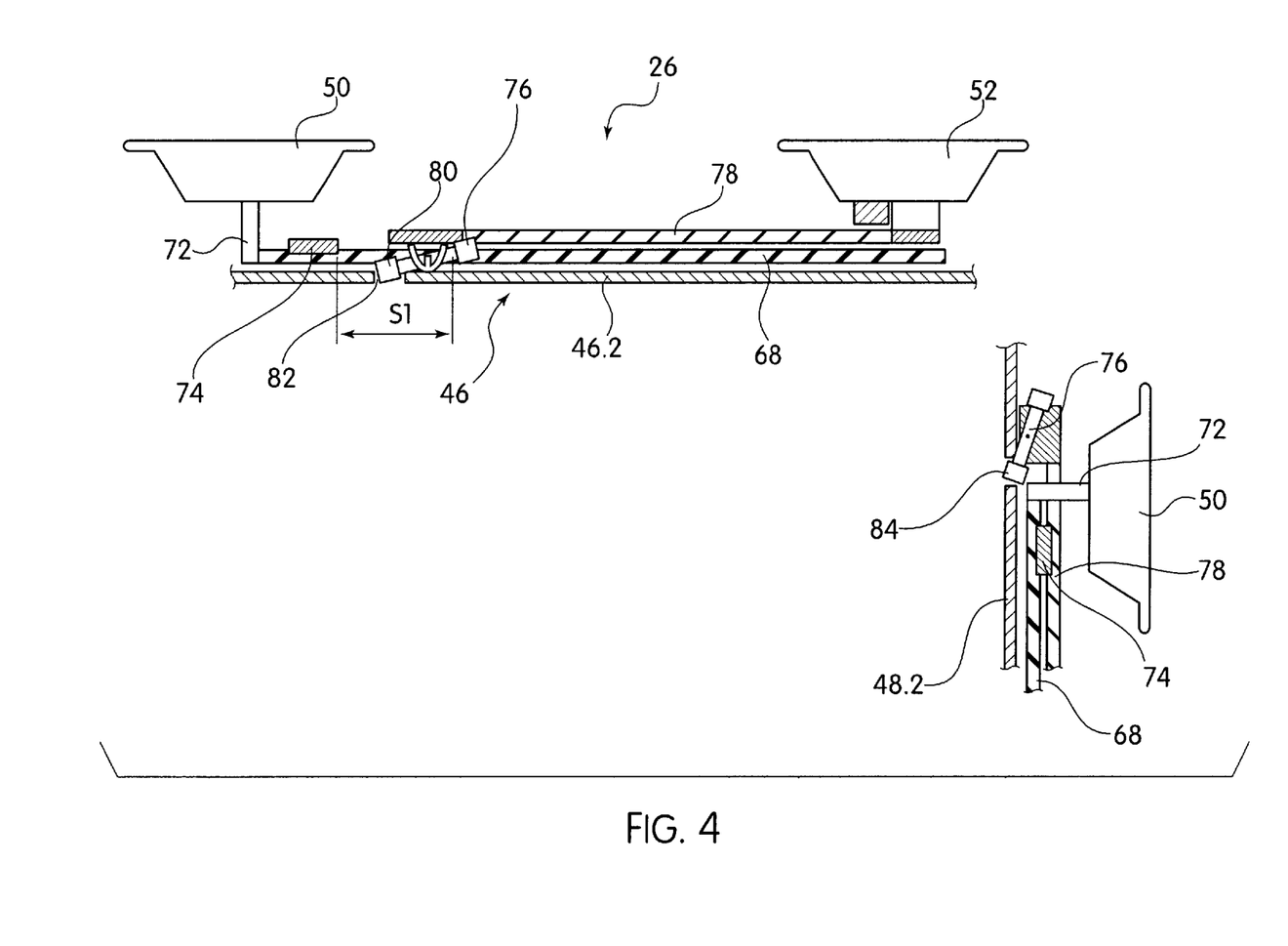
FIG. 4 is a schematic view of the drive mechanism of the sliding convertible top in a first example embodiment.
Figure 5:
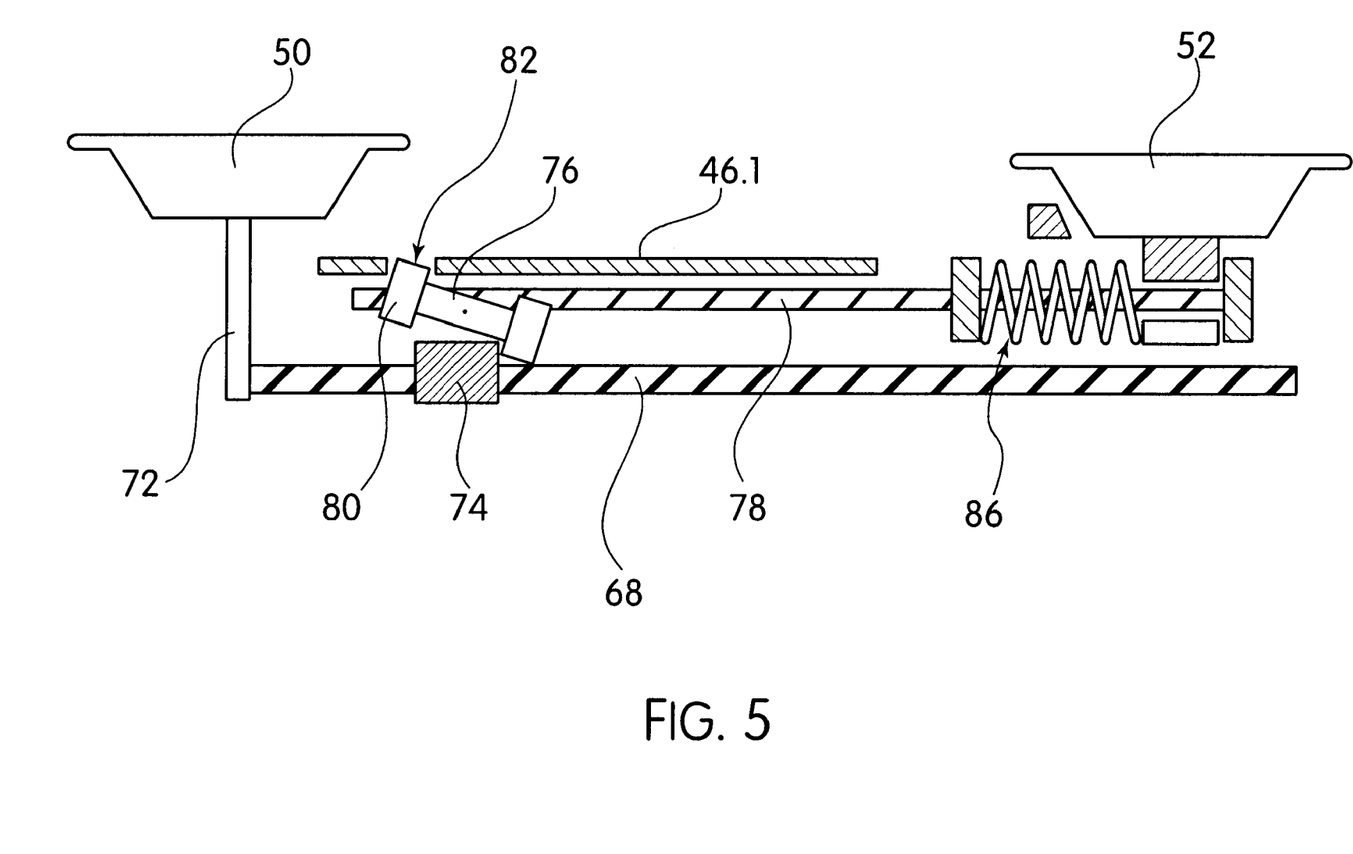
FIG. 5 is a schematic diagrammatic representation of the drive mechanism of the sliding convertible top in a further example embodiment.

FIGS. 4 and 5 illustrate a schematic diagrammatic representation of the drive mechanism of the sliding convertible top 26 in a first example embodiment and in a further example embodiment. FIG. 4 illustrates a detail of the front and rear convertible-top sections 50, 52 of the sliding convertible top 26 and also of the bottom chord 46.2 of the guide rail 46. Extending inside the guide rails 46, 48 in the front and rear roof regions 12, 14 are in each case a lateral left-hand and a lateral right-hand drive cable 68, which are driven via a common motor 70 as illustrated in FIGS. 2 and 3. The front convertible-top section 50 is fastened to the respective front end of the drive cable 68 via an intermediate piece 72. If the two drive cables 70 are now moved linearly rearwardly for opening the sliding convertible top 26, the drive cables 68 drag the front convertible-top section 50 rearwardly via the intermediate piece 72. Additionally, an engagement piece 74 is secured to the respective drive cable 68 and engages with a rocker 76 when the drive cables 68 are moved linearly backwardly, the distance between the initial position and the engagement position of the engagement piece 74 corresponding to the distance s1. Therefore, independently of the rear convertible-top section 52 remaining in a fixed position, only the front convertible-top section 50 is moved rearwardly over this distance s1 in order to relieve the folding cover 58—as already explained with reference to FIGS. 1 to 3. The rocker 76 is fastened to a spacer 78, which is fastened at the other end to the rear convertible-top section 52. This spacer 78 defines the distance L2 over which the front and rear convertible-top sections 50, 52 are moved relative to one another during the opening of the sliding convertible top. Once the engagement piece 74 engages with the rocker 76, a rocker arm 80 is disengaged from an opening 82 in the bottom chord 46.2 of the guide rail 46, and at the same time the uniform distance L2 which is maintained by the front convertible-top section 50 relative to the rear convertible-top section 52 during the opening of the sliding convertible top 26 is set.

Once the rear convertible-top section 52—as illustrated in FIG. 4—has reached a stowage position, which is vertical in this case, the further rocker arm 84 of the rocker 76 engages with an opening 86 in the bottom chord 48.2 of the guide rail 48. As a result, the engagement piece 74 is disengaged from the rocker 76, and the rear convertible-top section 52 remains in situ, while the front convertible-top section 50, during the further opening of the convertible top 26, is moved further in the direction of the rear convertible-top section 52 with the center convertible-top section 54 being folded together. The front convertible-top section 50 also reaches the end position illustrated in FIG. 3 and the opening operation of the sliding convertible top 26 has been completed. The closing operation is accordingly effected in the reverse order.

FIG. 5 illustrates a further example embodiment of the drive mechanism of the sliding convertible top 26, in which, unlike the example embodiment illustrated in FIG. 4, the rocker arm 80 of the rocker 76 is brought into engagement with an opening 82 in the top chord 46.1 of the guide rail 46. When the convertible top 26 is being opened, the engagement piece 74 engages the rocker 76 by the drive cable 68 being moved back, the rocker arm 80 being disengaged from the opening 82 in the top chord 46.1 of the guide rail 46. In this case, the spacer 78 includes a spring element 86, with which the distance L2 between the front and the rear convertible-top sections 50, 52 may be varied so that the folding cover 58 remains permanently tightened during the opening of the convertible top 26 as a result of the spring force of the spring element 86.

Figure 6:
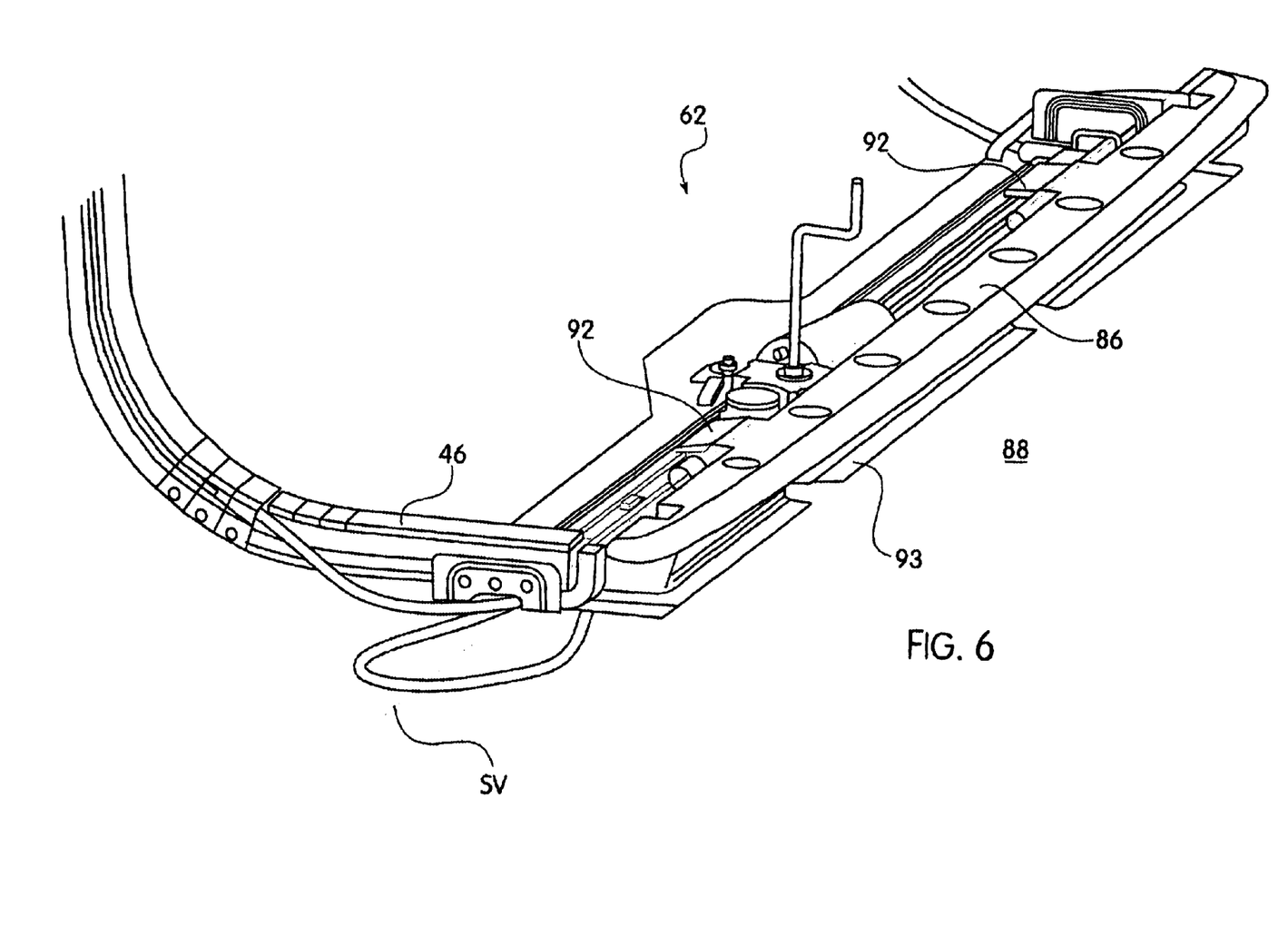
FIG. 6 is an enlarged schematic perspective view of an example embodiment of the convertible-top stowage space of the closed sliding convertible top illustrated in FIG. 2.
Figure 7:
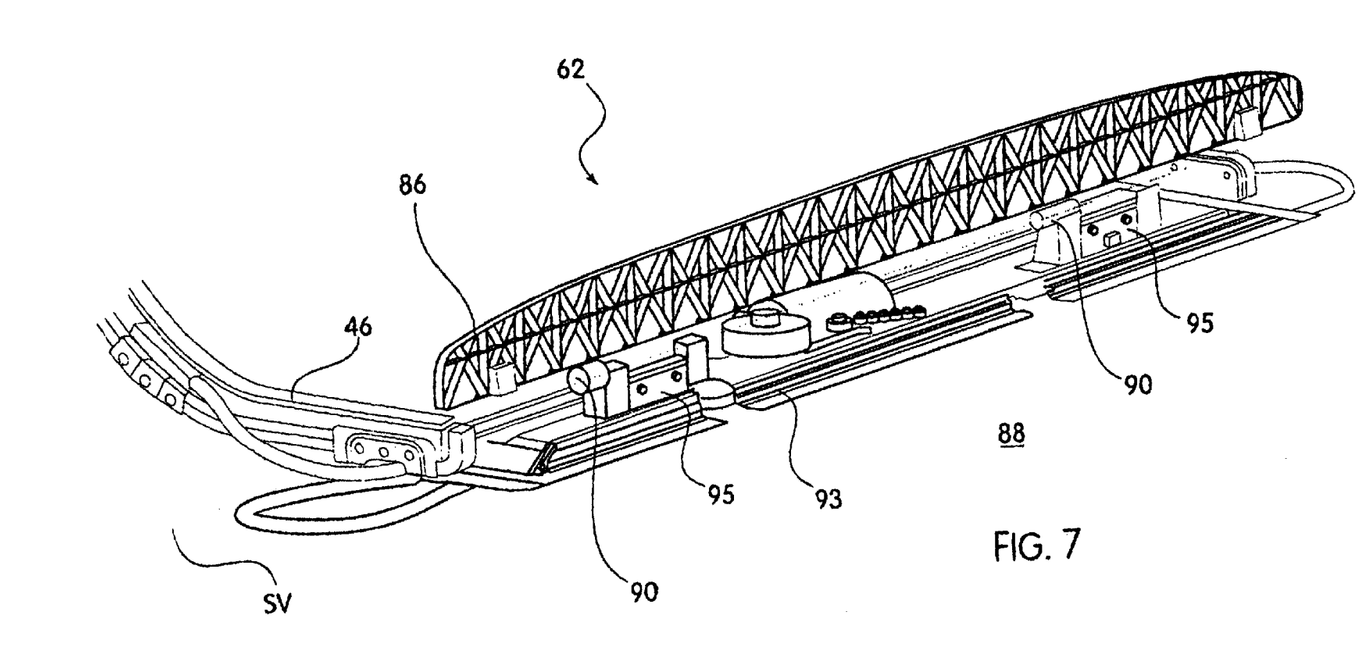
FIG. 7 is an enlarged schematic perspective view of the convertible-top stowage space of the open sliding convertible top illustrated in FIG. 3.

An exemplary embodiment of the convertible-top stowage space 62, with closed sliding convertible top illustrated in FIG. 2 or respectively with open sliding convertible top illustrated in FIG. 3, is illustrated in FIGS. 6 and 7 in an enlarged schematic perspective view. In this case, a convertible-top protective flap 86 is assigned to the sliding convertible top 26, the convertible-top protective flap 86 being mounted on the rear end of the guides 46 of the rear roof region 14 so as to be pivotable about a pivot axis SV. In FIG. 6, the convertible-top protective flap 86, which in this case is configured as a flat panel, is illustrated in a swung-down position approximately parallel to and above the bottom 88 of the luggage boot. In FIG. 7, the convertible-top protective flap 86 is illustrated in a raised position—extending approximately perpendicularly to the bottom 88 of the luggage boot and over a considerable part of the height between the latter and a lid 44 of the luggage boot (FIG. 1). Thus, the convertible-top protective flap 86, in the raised position, forms the separation between convertible-top stowage space 62 and luggage boot. The convertible-top protective flap 86 is held in a raised position of use by two spring elements 90, two holding sections 92 (FIG. 6) being provided on the side of the pivot axis SV opposite the convertible-top protective flap 86, these holding sections 92 arranged in a plane with the convertible-top protective flap 86 and being configured in one piece with the latter. In this case, vertically extending stop surfaces 94, illustrated in FIG. 7, are provided on the pedestal region 93 of the convertible-top protective flap 86, against which stop surfaces 94 the holding sections 92 are pressed by the force applied by the spring elements 90. When the sliding convertible top 26 is closed, the convertible-top protective flap 86 may thus be swung rearwardly down into a horizontal position, and the convertible-top stowage space 62 not utilized by the convertible top 26 may be utilized as an additional region of the luggage boot. If the convertible-top protective flap 86 has been swung into a horizontal position, opening of the sliding convertible top 26 may be prevented, for example, via a scanning switch, etc. Likewise, via a scanning switch, etc., the convertible-top protective flap 86 may be prevented from being swung down when the convertible top 26 is already open. The convertible-top protective flap 86 may be configured with a height such that it projects above the rear convertible-top section 52, illustrated in FIG. 3, when the sliding convertible top 26 is open. This is intended to prevent a vehicle occupant from putting a piece of luggage down on the rear convertible-top section 52.

What is claimed is:

1. A motor vehicle, comprising:
   a front roof region with a roof opening closeable by a sliding convertible top; and
   a rear roof region having roof columns connected to one another via a body crossmember;
   each of the front roof region and the rear roof region including lateral guides configured to provide sliding guidance of the sliding convertible top, the guides configured to guide the sliding convertible top substantially horizontally rearwardly in the front roof region and lowered downwardly into a stowage position in the rear roof region, the guides in the rear roof region arranged on a side of the roof columns that faces an interior space of the motor vehicle, the guides configured to guide the sliding convertible top in front of the body crossmember of the rear roof region between the roof columns.

2. The motor vehicle according to claim 1, wherein the front roof region includes two removable roof spars that extend between a windscreen frame and the rear roof region and which laterally define the roof opening, the spars including the guides of the front roof region.

3. The motor vehicle according to claim 1, wherein the sliding convertible top is configured to be lowered into a convertible-top stowage space arranged below an aperture of a rear wall of the rear roof region.

4. The motor vehicle according to claim 3, wherein the convertible-top stowage space is separable from a boot space by a pivotable convertible-top protective flap.

5. The motor vehicle according to claim 1, wherein the guides of the sliding convertible top extend a distance in front of the rear wall and approximately vertically.

6. The motor vehicle according to claim 1, wherein the sliding convertible top includes a rigid front convertible-top section and a rigid rear convertible-top section connected via a center convertible-top section and configured to be pushed together, a control arrangement configured to be provide during opening of the roof, the control arrangement configured to enable the center convertible-top section to be shortened only after the rear convertible-top section has reached a stowage position.

7. The motor vehicle according to claim 6, wherein the center convertible-top section is configured to be shortened by pushing together a folding cover.

8. The motor vehicle according to claim 7, further comprising drag bows distributed over a length of the center convertible-top section and configured to be firmly connected to the folding cover and to be guided in the guides.

9. The motor vehicle according to claim 1, wherein the front convertible-top section is configured to be moved toward the rear roof region with the center convertible-top section shortened in accordance with an initial opening phase of opening of the roof.

10. The motor vehicle according to claim 6, further comprising a drive cable assigned to the lateral guides of the front and the rear roof regions, the front and rear convertible-top sections configured to be taken along by and uncoupled from the drive cable.

* * * * *